April 6, 1943.                B. A. BRYON                2,315,838
                          WHEEL TRACTION DEVICE
                           Filed Dec. 11, 1940
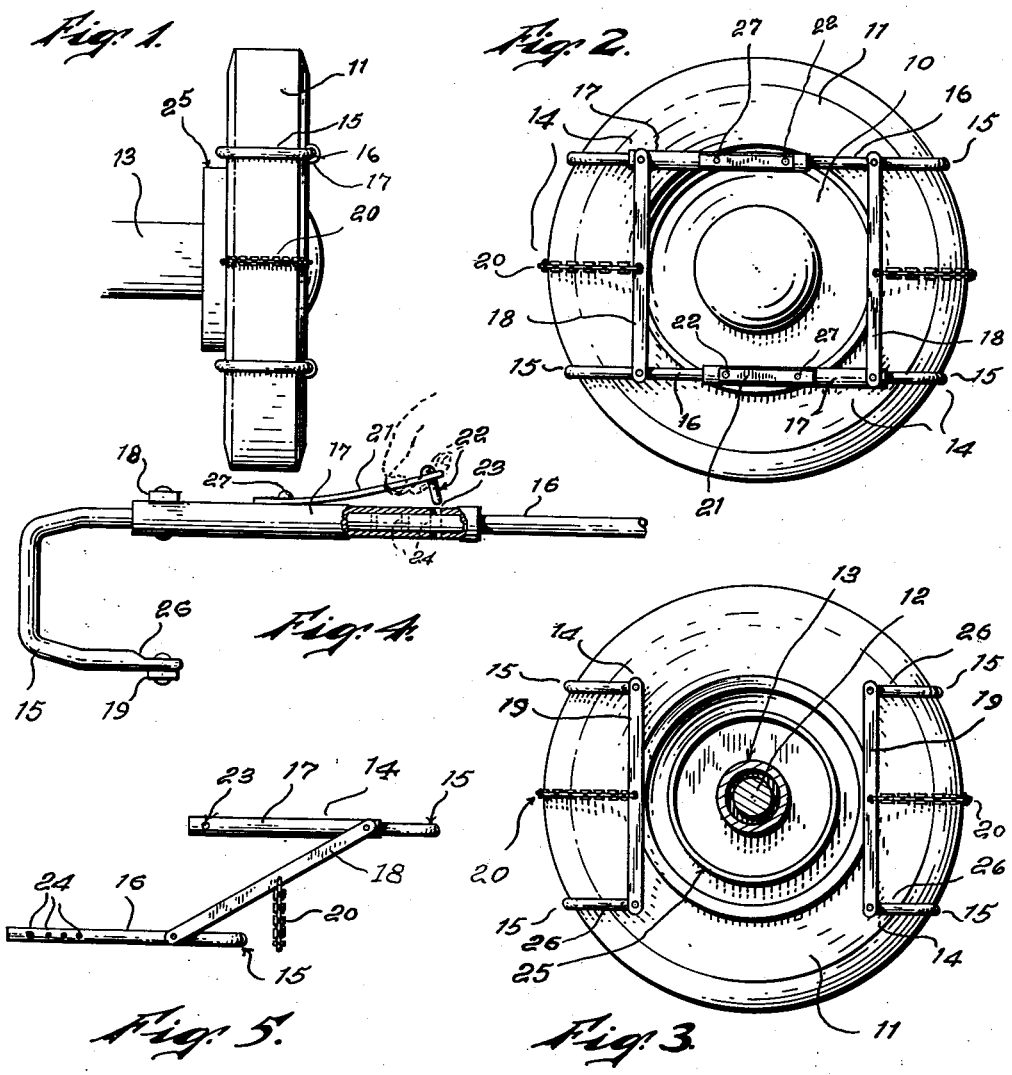
INVENTOR:
BENN ADELMER BRYON,
BY:
Horace S. Woodward Patented Apr. 6, 1943

2,315,838

UNITED STATES PATENT OFFICE 2,315,838

WHEEL TRACTION DEVICE

Benn Adelmer Bryon, Saugerties, N. Y.

Application December 11, 1940, Serial No. 369,602

2 Claims. (Cl. 152—223)

The invention relates to traction devices attachable to motor vehicle wheels, and particularly useful in application to wheels having pneumatic tires, intended to be applied to the wheels of an automobile or the like when the condition of the roadway is such that the usual tire treads are ineffective in enabling the vehicle to be moved with certainty and efficiency.

The invention is also applicable as an anti-skid device to be applied to such vehicle wheels.

It is an important aim of the invention to improve the construction of an attachable device of this kind so as to enable it to be applied to a vehicle wheel without requiring lifting of the wheel, or movement of the vehicle to bring the wheel into proper relation to the device for its final adjustment.

A further very important aim of this invention is to present a construction of anti-skid and traction device which a single person may apply to a vehicle wheel while the wheel is stationary and resting upon the ground in normal condition.

A further important aim of the invention is to provide such an article which will be adjustable to wheels and cars of various sizes without requiring special manufactured sizes to be produced.

A further important aim of the invention is to provide a device of this character which will not require springs or other devices for taking up slack in chain elements or other elements thereof. A still further aim is to evolve an article attaining the previously mentioned objects which, at the same time, will be extremely simple to manipulate and will be free from liability of failure or derangement incident to the use to be expected, and which will be readily adapted to long service and effective functioning in preventing skidding, and affording satisfactory traction of vehicles as heretofore constructed.

Additional objects, advantages and features of invention reside in the construction, arrangement and combination of parts involved in the embodiment of the invention, as will be more readily understood from the following description and the accompanying drawing, wherein Figure 1 is an elevational view of a wheel upon which my invention has been installed.

Figure 2 is a side elevation of the same wheel.

Figure 3 is an inner elevation of the preceding figure, looking in a direction opposite to that involved in Figure 2.

Figure 4 is an enlarged elevation, partly in section, of the telescopic connection between the sections of my device.

Figure 5 is a view of one of the sections partly collapsed.

There is illustrated, conventionally, a wheel 10 upon which a pneumatic tire 11 is mounted in any usual way, the wheel being carried upon an axle 12, which in turn is mounted in the usual axle housing 13. These are all elements of conventional construction well known in the art, and my invention is applicable to wheels and tires of various sizes and various proportions. Applied to the tire there is a traction device consisting of two units, adapted to be applied to the wheel or tire by presentation against the tire from opposite directions, ordinarily, from the front and rear sides. Each of the sections consists of two hook-shaped cross members 15, which may be made of bar iron or steel of suitable quality and thickness for the purposes contemplated, one of these cross members having a shank portion 16, while the other cross member in the same unit has a tubular shank 17, the first shank being formed by a continuation of the material of the cross member, which is ordinarily formed of rod material, while the tubular shank is formed of an appropriate piece of tubing fitting snugly upon the rod material close to the base of the hook, to which it may be secured by welding or otherwise. From the bight of the hook member in each instance, the shank in each instance may extend the same distance. A side link 18, consisting of a simple bar of metal, is pivotally connected to the two shanks in each unit at the base of the hook element, and at the opposite side of the unit the extremities or bills of the hook members are similarly connected by a similar link 19. Between these links there may be connected any desired number of cross chains 20, which may be of usual construction in conventional anti-skid chain devices, having sufficient size to pass freely around a tire when the two hooks of the unit are set so as to receive the tread of the tire in the bights of the hooks, as shown in Figures 2 and 3. The cross chains may be entirely omitted if desired.

On the side of each tubular shank, there is mounted adjacent the base of the hook, a leaf spring 21, extended longitudinally of the shank, with its free swinging end closely adjacent the outer end of the tubular shank. Fixed in the end of the spring, there is a latching pin 22, and the tubular shank is diametrically apertured so as to receive this pin therethrough under action of the spring, the aperture being indicated at 23, in Figure 4. Each of the solid shanks 16 is formed with a series of diametrical apertures 24, so arranged that when the solid shank of one unit is inserted in the tubular shank of another unit and the solid shank of the latter unit is received in the tubular shank of the first unit, the apertures 24 will be in a plane coincident with the apertures 23 of the tubular shank, and as the solid shanks are moved telescopically in the tubular shank, the pin when released will be thrust inwardly so as to enter one of the apertures 24, and lock the inner or solid shank 16 to the tubular shank 17.

In the use of this article, it will be noted that when the two units are detached, due to the pivotal connection effected by the links 18 and 19, each unit may move to a substantially flat collapsed position, enabling its ready storage in a minimum space, a partially collapsed relation of the parts being indicated in Figure 5.

When the device is to be used, the motor vehicle may be stopped in any convenient place, and two units for each wheel are applied to the wheels of the vehicle. These units are separated from each other and are presented to the tire of the wheel so that the shanks of the hooks pass beside the tire and wheel at the outer side, and so that the hooks or cross members 15 engage across the tire, receiving the tire within the hook portions, substantially as shown in Figures 2 and 3, and Figure 1. By presenting the shanks of the hooks in a horizontal direction, the two units may be brought together upon the tire without interference therewith by engagement of the wheel upon the ground or even if it is sunken in soft earth, and without interference with running gear of the vehicle or brake devices 25 at the inner sides of the wheels.

The two units being properly presented to a wheel, the solid shanks are entered in the ends of the tubular shanks, the springs 21 being drawn outwardly so as to permit free entry of the shanks 16 into the shanks 17 to a proper distance to permit the hook elements to rest against the tread portions of the tire properly. Preferably, the solid shanks of the opposed units are engaged to the same depth in the tubular shanks, so that when the device is finally adjusted the planes of the connected hook members will be spaced equally above and below the axis of the wheels, as shown in Figure 2. At this position, the arcs of the tires between the two hooks of each unit will support the device, so that it will not fall lower, and when the wheel is rotating it will not move excessively in either direction, transverse to the planes of the hooks.

If desired, two or more sets of coupled units may be engaged with the same tire, which may be effected by moving the vehicle so as to give the wheel a quarter turn after engagement of the first set therewith, and then applying the second set at right angles to the first, these being discretionary, according to the wishes of the user. With the single device applied as indicated, the wheel is afforded ample traction, corresponding to that gained by the use of tire chains of conventional form, and the device also has corresponding advantages in preventing skidding.

It will be appreciated that the tire 11 has a medial major plane which is substantially the plane of the wheel, and that the extreme side walls of the tire lie in what may be termed outer and inner planes respectively, when the tire is mounted on a vehicle wheel. The connections between the opposed units 14 engaged with a tire as described may therefore be said to lie adjacent the outer plane of the tire, and the two shank connections at this outer side of the device as applied to a tire and wheel constitute the only connection between the opposed units.

The cross members 15 in their hook-like form need only embrace the tire sufficiently to prevent the bill portions 26 from being drawn away from the tire by movement in the direction of the axis of the tire and wheel, which may be assumed to be coincident.

While the links 18 and 19 are shown as rigid bars, they may be each made of a plurality of parts if desired, and other materials may be employed as found desirable or practicable, they being essentially tension elements to hold the two hook-like cross members in each unit against separation beyond their proper spaced relation when properly engaged with a tire.

It will be understood that tubular shanks and corresponding solid shank complementary thereto may be used in either circular cross sectional form or angular in cross section. It will also be noted that by using a single rivet 27 to hold the base of the spring 21, the latter may be moved pivotally on this rivet to swing the pin 22 aside while placing the device on a wheel, so that the shanks 16 may be more readily entered in the shanks 17.

I claim:

1. A wheel traction device consisting of two units, each including two spaced apart hook-like members having base portions and having bill portions presented inwardly at one side of the unit, said units being arranged for wheel-engagement with their bases adjacent the outer side of the wheel and with their bill portions arranged to receive the outer tread portion of a tire therein and to fit partly around such tire transversely in embracing relation, one hook-like member in each unit having a tubular shank extended from its base, the other hook-like member of such unit having a shank at its base adapted to engage slidably in the tubular shank of an opposed similar unit, and means to releasably fasten the telescoped shanks in adjusted positions.

2. The structure of claim 1 in which said second named shank portions have formed transversely therethrough a series of longitudinally spaced openings, and a spring-loaded pin mounted on the tubular shank and slidably engaged transversely therethrough for entry into an opening of the shank inserted in the tubular one.

BENN ADELMER BRYON.